(12) United States Patent
Schliessner

(10) Patent No.: US 8,533,919 B2
(45) Date of Patent: Sep. 17, 2013

(54) FASTENING ELEMENT TO BE FASTENED IN A HOLE

(75) Inventor: Lothar Schliessner, Linden (DE)

(73) Assignee: Newfrey LLC, Newark, DE (US)

( * ) Notice: Subject to any disclaimer, the term of this patent is extended or adjusted under 35 U.S.C. 154(b) by 214 days.

(21) Appl. No.: 12/478,267

(22) Filed: Jun. 4, 2009

(65) Prior Publication Data
US 2009/0307883 A1    Dec. 17, 2009

(30) Foreign Application Priority Data
Jun. 11, 2008 (DE) .................... 20 2008 007 783 U

(51) Int. Cl.
*F16B 21/08* (2006.01)
*F16B 5/06* (2006.01)
*F16B 13/04* (2006.01)

(52) U.S. Cl.
USPC ............... 24/458; 24/297; 248/71; 411/510

(58) Field of Classification Search
USPC ............. 24/453, 458, 297, 292, 291, 289, 24/584.1, 614; 411/508–510; 296/1, 39.1, 296/146.7; 248/68.1, 71, 73, 74.2
See application file for complete search history.

(56) References Cited

U.S. PATENT DOCUMENTS

| | | | |
|---|---|---|---|
| 3,177,540 A * | 4/1965 | Hall et al. | 411/508 |
| 3,481,242 A * | 12/1969 | Topf | 411/502 |
| 3,483,787 A * | 12/1969 | Saunders | 411/510 |
| 3,550,217 A * | 12/1970 | Collyer | 411/509 |
| 3,776,495 A * | 12/1973 | Hartz et al. | 248/71 |
| 4,396,329 A * | 8/1983 | Wollar | 411/508 |
| 4,566,660 A | 1/1986 | Anscher | |
| 4,609,170 A * | 9/1986 | Schnabl | 248/71 |
| 4,705,442 A * | 11/1987 | Fucci | 411/510 |
| 4,865,281 A * | 9/1989 | Wollar | 248/71 |
| 4,902,182 A * | 2/1990 | Lewis | 411/510 |
| 4,936,530 A * | 6/1990 | Wollar | 248/71 |
| 4,988,308 A * | 1/1991 | Toedtman | 439/248 |
| 5,007,779 A * | 4/1991 | Goran | 411/48 |
| 5,306,098 A * | 4/1994 | Lewis | 411/510 |
| 5,316,245 A | 5/1994 | Ruckwardt | |
| 5,368,261 A * | 11/1994 | Caveney et al. | 248/73 |
| 5,393,185 A * | 2/1995 | Duffy, Jr. | 411/510 |
| 5,468,108 A * | 11/1995 | Sullivan et al. | 411/510 |
| 5,505,411 A * | 4/1996 | Heaton et al. | 248/70 |

(Continued)

FOREIGN PATENT DOCUMENTS

| | | |
|---|---|---|
| EP | 1887232 A2 | 2/2008 |
| WO | 2007070207 A1 | 6/2007 |

OTHER PUBLICATIONS

European International Search Report dated Sep. 11, 2009.

*Primary Examiner* — Robert J Sandy
*Assistant Examiner* — Rowland D Do
(74) *Attorney, Agent, or Firm* — Michael P. Leary

(57) ABSTRACT

A holding element for fastening in a hole of a carrier part has a central shaft extending along a longitudinal axis, a supporting part fastened to the far end of the shaft and projecting laterally, and at least one arm, a fastening end of which is fastened movable to the shaft. The arm extends transverse to the longitudinal axis and for some distance from the shaft and in a direction parallel to the longitudinal axis is supportable on the supporting part and in the opposite direction is supportable on a guide part fastened to the front end of the shaft.

17 Claims, 2 Drawing Sheets

(56) References Cited

U.S. PATENT DOCUMENTS

| | | | |
|---|---|---|---|
| 5,636,937 A * | 6/1997 | Zemlicka | 403/388 |
| 5,672,038 A * | 9/1997 | Eaton | 411/510 |
| 5,704,573 A * | 1/1998 | de Beers et al. | 248/73 |
| 5,803,414 A * | 9/1998 | Wright | 248/74.4 |
| 5,813,810 A * | 9/1998 | Izume | 411/510 |
| 5,829,937 A * | 11/1998 | Morello et al. | 411/510 |
| 5,907,891 A * | 6/1999 | Meyer | 24/453 |
| 5,921,510 A * | 7/1999 | Benoit et al. | 248/71 |
| 6,119,306 A * | 9/2000 | Antonucci et al. | 16/86 A |
| 6,273,656 B1 * | 8/2001 | Cleland et al. | 411/45 |
| 6,305,055 B1 * | 10/2001 | Castro | 24/458 |
| 6,536,718 B2 * | 3/2003 | Benito-Navazo | 248/71 |
| 6,669,426 B1 * | 12/2003 | Detter et al. | 411/510 |
| 6,719,513 B1 * | 4/2004 | Moutousis et al. | 411/510 |
| 6,799,931 B2 * | 10/2004 | Kwilosz | 411/510 |
| 6,804,864 B2 * | 10/2004 | Kirchen et al. | 24/297 |
| 6,974,292 B2 * | 12/2005 | Hansen | 411/508 |
| 7,350,999 B2 * | 4/2008 | Brletich et al. | 403/10 |
| 7,503,528 B2 * | 3/2009 | Adams et al. | 248/71 |
| 7,793,895 B2 * | 9/2010 | Franks | 248/74.3 |
| 7,891,926 B2 * | 2/2011 | Jackson, Jr. | 411/510 |
| 7,896,601 B2 * | 3/2011 | Kalyanadurga et al. | 411/510 |
| 7,988,105 B2 * | 8/2011 | Kamiya et al. | 248/71 |
| 2005/0242247 A1 * | 11/2005 | Geiger | 248/74.3 |
| 2007/0134073 A1 * | 6/2007 | Shereyk et al. | 411/510 |
| 2008/0313868 A1 * | 12/2008 | Kamiya et al. | 24/453 |

\* cited by examiner

Fig. 1
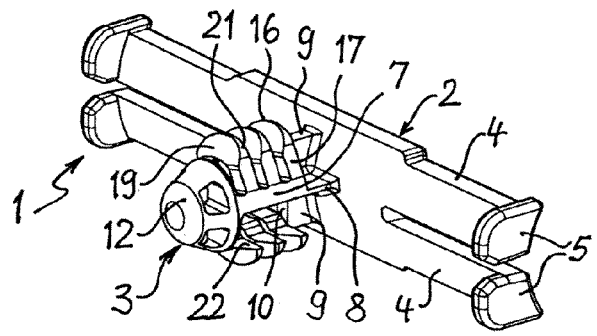
Fig. 2
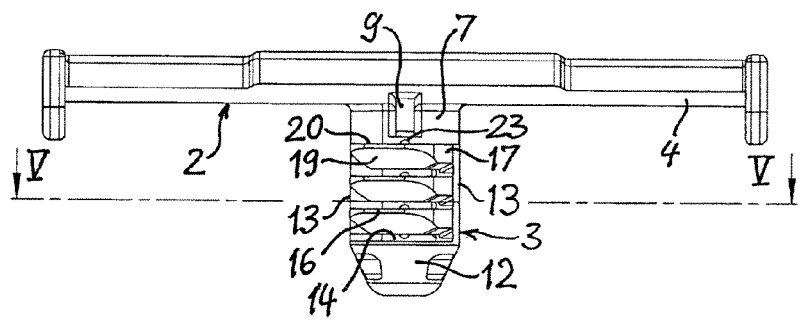
Fig. 3
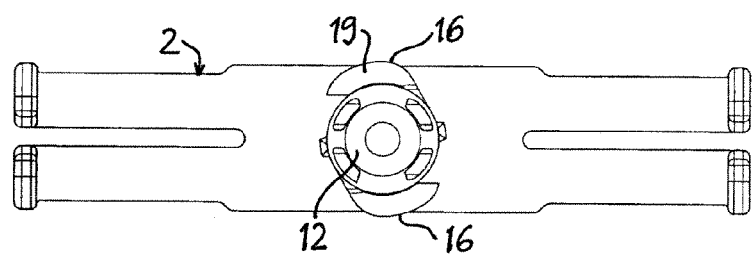
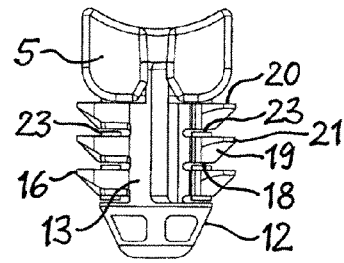
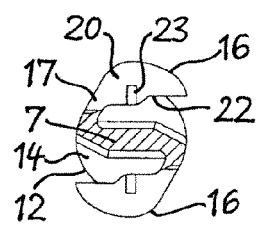
Fig. 4                    Fig. 5

FASTENING ELEMENT TO BE FASTENED IN A HOLE

CROSS-REFERENCE TO RELATED APPLICATIONS

This application claims the benefit of German Application No. 20 2008 007 783.4, filed Jun. 11, 2008. The disclosure of the above application is incorporated herein by reference.

BACKGROUND OF THE INVENTION

The invention relates to a holding element for fastening in a hole of a carrier part having a central shaft extending along a longitudinal axis, a supporting part projecting laterally and fastened to the far end of the shaft, and at least one arm, a fastening end of which is flexibly fastened to the shaft.

Holding elements of the kind indicated are used particularly in the automotive industry, to fasten structural parts of various types in simple fashion to a carrier part provided with a hole. Here mounting should be possible by a single inserting operation with little force and the assembled holding element should be able to transmit as great as possible holding forces to the carrier part. Since the thickness of the carrier parts and hence the length of the fastening hole frequently varies, the requirement to design the holding element so that it is equally suitable for a variety of hole lengths also exists. In addition, it is required that the holding element be usable for a variety of hole diameters.

U.S. Pat. No. 5,316,245 and U.S. Pat. No. 4,566,660 disclose two variants of holding elements for fastening structural parts to a carrier aperture. One variant has a pin with a conical front end, to which are attached a plurality of tapered holding lips arranged spaced apart one after another, which on two opposite sides are interrupted by slots. The holding lips are elastically deformable and, when the holding element is pressed into the carrier hole, are bent over inward.

In the second known embodiment, the holding element has springy arms on opposite sides of a shaft, which are fastened by one end to the insertion end of the shaft and extend diverging in the direction of the other end of the shaft. Upon insertion into a hole, the arms are at first pressed together and spring back into their starting position again when their free ends emerge from the hole.

SUMMARY OF THE INVENTION

The holding element according to one aspect of the invention has a central shaft extending along a longitudinal axis, a supporting part fastened to the far end of the shaft and projecting laterally from the shaft, and at least one arm, a first end of which is flexibly fastened to the shaft. The arm extends transverse to the longitudinal axis for some distance from the shaft and in a direction parallel to the longitudinal axis is supportable on the supporting part and in the opposite direction is supportable on a guide part, which is fastened to the front end of the shaft.

According to another aspect, the arm, in contrast to the known designs, is movable in a plane crossing the longitudinal axis of the shaft at right angles and is firmly supported in the longitudinal direction of the shaft. In this way, the arm can be designed very easily movable in the radial direction, owing to which small insertion forces can be obtained. Upon a force against the direction of insertion, the arm is firmly supported on the guide part, so that great holding forces can be accommodated.

According to another aspect, the at least one arm is provided on the outer side turned away from the shaft with an outer contour curved substantially arc-like. In addition, the arm has on its front turned toward the guide part an inclined ramp surface, which extends along the curved outer contour. On the inner side turned toward the shaft, the arm may in addition be provided with a supporting surface, which is capable of being applied to the shaft, in order to limit the spring movement of the arm in the direction of the shaft. On the back turned toward the supporting part, the arm has a flat back surface, which is aligned perpendicular to the longitudinal axis of the shaft. Owing to the flat back surface, the holding forces to be supported by the arm on the carrier part act substantially perpendicular to the direction of movement of the arm, so that no force components worth mentioning occur by which the arm might be pressed out of the holding position. The front surface supporting the arm on the carrier part preferably is also flat and is aligned perpendicular to the longitudinal axis of the shaft, so that no force components are produced in the direction of movement of the arm.

According to another aspect, the shaft has the form of a substantially rectangular plate, where at least one arm is located on either side of the plate in each instance and where the fastening ends of the arms are flexibly fastened to opposite edges of the plate. This rotationally symmetrical design of the holding element, referred to the longitudinal axis, produces a support secure against tipping and, owing to the double support on both sides of the shaft, contributes to obtaining higher holding forces.

For adaptation to a variety of lengths of the carrier hole, according to an additional aspect a plurality of arms may be arranged parallel side by side on the shaft at such a distance apart that they are supportable on one another. In this way, depending upon the length of the hole, one or the other arm can be supported on the carrier part, so that proper anchorage of the holding element is always achievable. If the shaft has a plurality of arms arranged parallel side by side on both sides, the arms of both sides may be arranged symmetrically to one another or the arms of one side may be arranged staggered with respect to the arms of the other side in the longitudinal direction of the shaft, in order to obtain an even more exact adaptation to variable hole lengths. In this case, however, only one arm always rests on the carrier part.

In order to keep the movability of an arm in the longitudinal direction of the shaft as small as possible, according to a further aspect, the arm may have on the front and/or the back a raised stop cam, by which it can be supported on the adjacent surface of the guide part, the supporting part or a second arm. In terms of molding technique, raised stop cams permit an especially small distance from the opposite surface.

The guide part fastened to the front end of the shaft preferably has the form of a truncated cone, the diameter of which increases in the direction of the shaft, while the ramp surface of the arm adjacent to the guide part is designed so that in the relaxed state of the arm its inner edge adjoins the edge of the greatest diameter of the guide part. Upon insertion, the guide part causes centering of the holding element in the hole of the carrier part, so that the edge of the hole is correctly guided on the ramp surface of the arm.

According to another aspect, the holding element may be connected at the far end of the shaft with any desired fastening element, for example a cable hanger, a cable strap, a piping strap, a holding plate, for fastening a cover part or the like. In addition, springy abutting elements or sealing elements, which cooperate with the front of the carrier part, may be mounted on the far end of the shaft. The holding element may be especially suitable for molding from thermoplastic synthetic material with use of the injection molding process.

BRIEF DESCRIPTION OF THE DRAWINGS

The invention is explained in detail below by exemplary embodiments that are represented in the drawing, wherein FIG. 1 shows a perspective view of a fastening element for a cable hanger having a holding element according to an exemplary embodiment of the invention.

FIG. 2 shows a side view of the fastening element of FIG. 1.

FIG. 3 shows a view of the insertion side of the fastening element of FIG. 1.

FIG. 4 shows a front view of the fastening element of FIG. 1.

FIG. 5 shows a cross section of the holding element along line V-V in FIG. 2.

DETAILED DESCRIPTION OF EXEMPLARY EMBODIMENTS OF THE INVENTION

Figure 6:
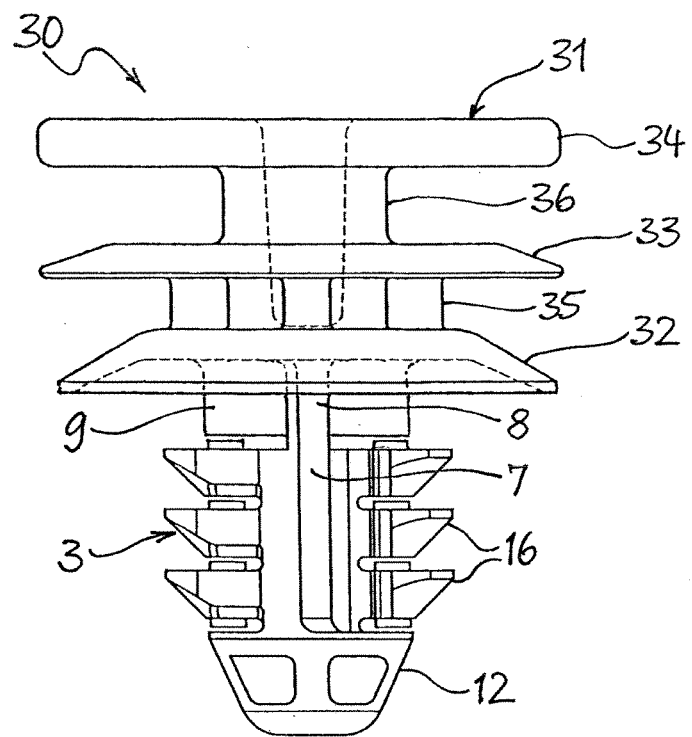
FIG. 6, a fastening element for a cover part having a holding element according to an exemplary embodiment of the invention.

The fastening element 1 illustrated in FIGS. 1 to 5 is intended for fastening a cable hanger and comprises an elongated support bar 2 and a holding element 3, which are made in one piece of synthetic material. The support bar 2 has end sections 4 divided by longitudinal slots, which at their ends bear feet 5 for support on a carrier part. The back of the support bar 2 turned away from the holding element 3 serves to support a cable hanger, which is then fastened to the support bar 2 by wrapping the end sections 4 and the cable hanger with a strap.

The holding element 3 has a plate-like shaft 7, which is aligned perpendicular to the support bar 2 and is fastened by its far end 8 to the support bar 2. The central plane of the shaft 7 runs substantially in the longitudinal direction of the support bar 2.

The far end 8 of the shaft 7 is in addition connected by supporting parts 9 with the support bar 2, which are located centrally on either side of the shaft 7 and extend transverse to the central plane of the shaft 7. The supporting parts 9 have on their face turned away from the support bar 2 supporting surfaces 10, which are aligned substantially perpendicular to the central plane of the shaft 7.

Fastened to the free front end of the shaft 7 is a guide part 12, which has the form of a truncated cone, the diameter of which decreases with distance from the shaft 7. The greatest diameter of the guide part 12 corresponds to the width of the shaft 7. The width of the shaft 7 is limited by elongated front sides 13, which directly adjoin the surface of the guide part 12, and which have the same curvature as the adjacent end of the guide part 12. The front surface 14 of the guide part 12 turned toward the shaft 7 is aligned plane and perpendicular to the central plane of the shaft 7.

Between the supporting parts 9 and the guide part 12, three arms 16 of like design are in each instance arranged parallel side by side on either side of the shaft 7. The arms 16 extend at some distance from the shaft 7 transverse to its longitudinal axis and are in each instance fastened to the shaft 7 by one end by an elastically bendable crosspiece 17. The crosspieces 17 are in each instance arranged on the opposite sides of the shaft 7 adjoining a longitudinal front side 13 at the lateral edge of the shaft 7, and the crosspieces 17 of one side adjoin another longitudinal front side 13 than the crosspieces 17 of the other side.

Each arm 16 has on the front a flat front surface 18 and an inclined and curved ramp surface 19 and on the back a flat back surface 20 parallel to the front surface 18. Radially outward with reference to the central axis of the holding element 3, the arm is limited by a convexly curved edge surface 21, which is smoothly converted into the outer surface of the crosspiece 17. The ramp surface 19 is located radially outside the front surface 18 and the boundary line between the two surfaces forms an arc of a circle, the radius of which corresponds to the greatest radius of the guide part 12. On the inner side turned toward the shaft 7, the arm 16 has a supporting surface 22, which is capable of being applied to the shaft 7, in order to limit the movement of the arm 16 in the direction of the shaft 7.

Between the individual arms 16, as well as between the guide part 12 and the arms 16 adjacent thereto, and between the supporting parts 9 and the arms 16 adjacent thereto, there is in each instance provided a sizeable gap, the width of which is optimally adapted to molding technique requirements. However, the size of the gap would result in an undesirably great movement of the arms 16 in the longitudinal direction of the shaft 7. In order to avoid this, on the back surfaces 20 of the arms 16 and in addition on the front surfaces 18 of the arms 16 adjacent to the guide part 12, there are located raised stop cams 23, which have only a very small distance from the respective opposite front surface 18 or supporting surface 10 or front surface 14. The cams 23 can easily be made by molding and therefore permit inexpensive production.

The holding element 3 is designed for fastening in a circular hole, the diameter of which must be at least great enough so that the guide part 12 can easily be inserted into the hole. Very exact adaptation of the hole diameter to the diameter of the holding element 3, however, is not required, since the arms 16 have a comparatively broad zone of engagement in the radial direction and therefore are able to adjust to relatively great diameter tolerances. The maximum range of variation with regard to hole length is determined by the number of arms 16 lying side by side. In the case of the smallest possible hole length, all arms 16 are pressed through the hole, so that the arms 16 adjacent to the supporting parts 9 can be supported by their back surface 20 on the carrier part. In the case of maximum possible hole length, only the arms 16 adjacent to the guide part 12 emerge from the hole on the back of the carrier part in mounting, in order to lock the holding element. The other arms remain in the hole and contribute to radial support and centering of the holding element 3.

In mounting of the holding element 3, after insertion of the guide part 12 into the hole of the carrier part, the hole edge at first comes into contact with the ramp surfaces 19 of the arms 16 adjacent to the guide part 12. Owing to the inclination of the ramp surfaces 19, the axial insertion force produces a force component directed radially inward, by which the bending resistance of the crosspieces 17 is overcome and the arms 16 are moved in the direction of the shaft 7. As a result, the arms 16 slide into the hole and the edge of the hole comes into contact with the ramp surfaces 19 of the next two arms. The operation continues until all arms 16 have been pressed into the hole and the insertion movement comes to a halt owing to contact of the feet 5 [of the] support bars 2 with the front of the carrier part. On the back of the carrier part, depending upon the length of the hole, one, two or three rows of arms have now passed through the hole and sprung back into their starting position. The arms 16 lying closest to the carrier part now hold, with their back surface 20, the holding element 3 firmly in the hole. In this way, they can be supported in the axial direction, either directly or by arms 16 lying in between, on the guide part 12. Owing to this design, the holding element 3 is able to transmit comparatively great holding forces to the carrier part.

FIG. 6 shows a fastening element 30, which consists of a holding element 3, described above, and a head 31, which is designed for fastening a cover part. The head 31, located on the far end of the holding element 3, has an elastically yielding support plate 32 and two holding plates 33, 34, which are arranged spaced apart and are connected together by crosspieces 35, 36. The elastically yielding support plate 32 is connected with the far end 8 of the shaft 7 and the supporting parts 9 and serves to support the fastening element 30 on the front of the carrier part. Owing to cooperation of the support plate 32, elastically yielding in the axial direction, with the holding element 3, the thickness tolerances of the carrier part can be adjusted, so that play-free support of the arms 16 locking the holding element on the back of the carrier part is always provided.

According to exemplary embodiments of the invention, the holding element may have characteristics such as low force of insertion, high holding force, good centerability, suitability for a variety of hole lengths and hole diameters, and in addition is simple and inexpensive to produce.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A holding element for fastening in a hole, the holding element comprising:
    a central shaft having a far end and a free end, the central shaft extending along a longitudinal axis between the far end and the free end,
    multiple supporting parts located at the far end of the shaft, the supporting parts located centrally on either side of the shaft and extending transverse to a central plane of the shaft, and
    multiple arms each including a distal end and a proximate end and a radially outward peripheral edge surface extending from the proximate end to the distal end and defining a first arc length, each arm flexibly fastened to the shaft at the proximate end by an integral joint defining a second arc length substantially less than the first arc length,
    wherein the arms each extends transverse to the longitudinal axis for a distance from the shaft and the integral joints fastening the arms to the shaft individually define elastically bendable crosspieces arranged on opposite sides of the shaft at lateral edges of the shaft; and
    wherein each arm includes on a front a flat front surface and an inclined and curved ramp surface and on a back a flat back surface parallel to the front surface, the arm being limited by an edge surface convexly curved radially outward with reference to the longitudinal axis which is smoothly converted into the outer surface of the crosspiece, and a supporting surface defining an end of the inclined and curved ramp surface extending freely away from the crosspiece and facing the shaft transverse to the longitudinal axis such that the supporting surface contacts the shaft to limit a movement of the arm toward the shaft.

2. The holding element of claim 1, wherein the holding element further comprises a guide part fastened to the free end of the shaft.

3. The holding element of claim 2, wherein the guide part has the shape of a truncated cone and tapers in a direction away from the supporting part.

4. The holding element of claim 3, wherein each of the arms is also supported by the guide part.

5. The holding element of claim 1, wherein each of the arms has the front turned toward the free end, and the arm inclined and curved ramp surface extends along a curved outer contour.

6. The holding element of claim 5, wherein on a back turned toward the supporting part, each of the arms has the flat back surface is aligned substantially perpendicular to the longitudinal axis of the shaft.

7. The holding element of claim 6, wherein the shaft has the form of a substantially rectangular plate including a short side and a long side and the joint of the arm is located on the short side.

8. The holding element of claim 7, wherein each of the arms has on at least one of the front and the back a raised stop cam, by which it is supportable on the adjacent surface of the guide part, the supporting part or a second arm.

9. The holding element of claim 8, wherein the guide part has the form of a truncated cone, the diameter of which decreases with distance from the shaft, while the inclined ramp surface of each of the arms adjacent to the guide part is arranged so that in the relaxed state of the arm its inner edge adjoins the edge of the greatest diameter of the guide part.

10. The holding element of claim 9, further comprising a fastening element located proximate to the far end of the shaft.

11. The holding element of claim 10, wherein the fastening element comprises one of a cable hanger, a cable strap, a piping strap and a holding plate, for fastening a cover part.

12. The holding element of claim 11, wherein one of a springy abutting element and a sealing element is located at the far end of the shaft.

13. The holding element of claim 1 wherein the distal end and the proximate end of each of the arms lie in a plane perpendicular to the longitudinal axis.

14. The holding element of claim 13 wherein the arm further includes a radially inward edge opposed to the shaft, and the shaft, the joint, and the inward edge partially define a gap, and the gap includes a radial opening between the distal end of the arm and the shaft.

15. The holding element of claim 1, wherein each of the arms includes:
    the flat back surface located at a first axial distance from the far end and facing the supporting part and extending a first radial distance from the shaft;
    the flat front surface located at a second axial distance from the far end greater than the first axial distance, the front surface facing away from the far end and extending a second radial distance from the shaft less than the first radial distance; and
    the ramp surface extending axially and radially between the back surface and the front surface, the ramp surface increasing radially from the front surface to the back surface.

16. The holding element of claim 15, wherein the ramp surface defines a pitch and the pitch varies circumferentially around the ramp surface between the proximate end and the distal end.

17. A holding element for insertion into and retention in a hole, the holding element comprising:

a central shaft extending along a longitudinal axis from a first end to a second end;

multiple supporting parts fastened to the first end of the shaft, the supporting parts located centrally on either side of the shaft and extending transverse to a central plane of the shaft;

a guide part fastened to the second end of the shaft, multiple arms located between each of the support parts and the guide part and extending transverse to the longitudinal axis of the shaft, the arms each including a first end flexibly fastened to the shaft, a second end distal to the shaft, and a ramp surface that is both inclined and curved; and wherein the second end of the each of the arms is movable in a plane perpendicular to the longitudinal axis of the shaft; and wherein each of the arms includes a supporting surface defining an end of the inclined and curved ramp surface extending freely away from a crosspiece and facing the shaft perpendicular to the longitudinal axis, on a front a flat front surface and the inclined and curved ramp surface and on a back a flat back surface parallel to the front surface, the arms each being limited by an edge surface convexly curved radially outward with reference to the longitudinal axis which is smoothly converted into the outer surface of the crosspiece such that the supporting surface contacts the shaft during movement of the second end in the plane perpendicular to the longitudinal axis to limit a movement of each of the arms toward the shaft.

* * * * *